March 20, 1928.  1,662,808
E. H. ALLFREE ET AL
CONVEYER
Filed Feb. 13, 1926  8 Sheets-Sheet 1
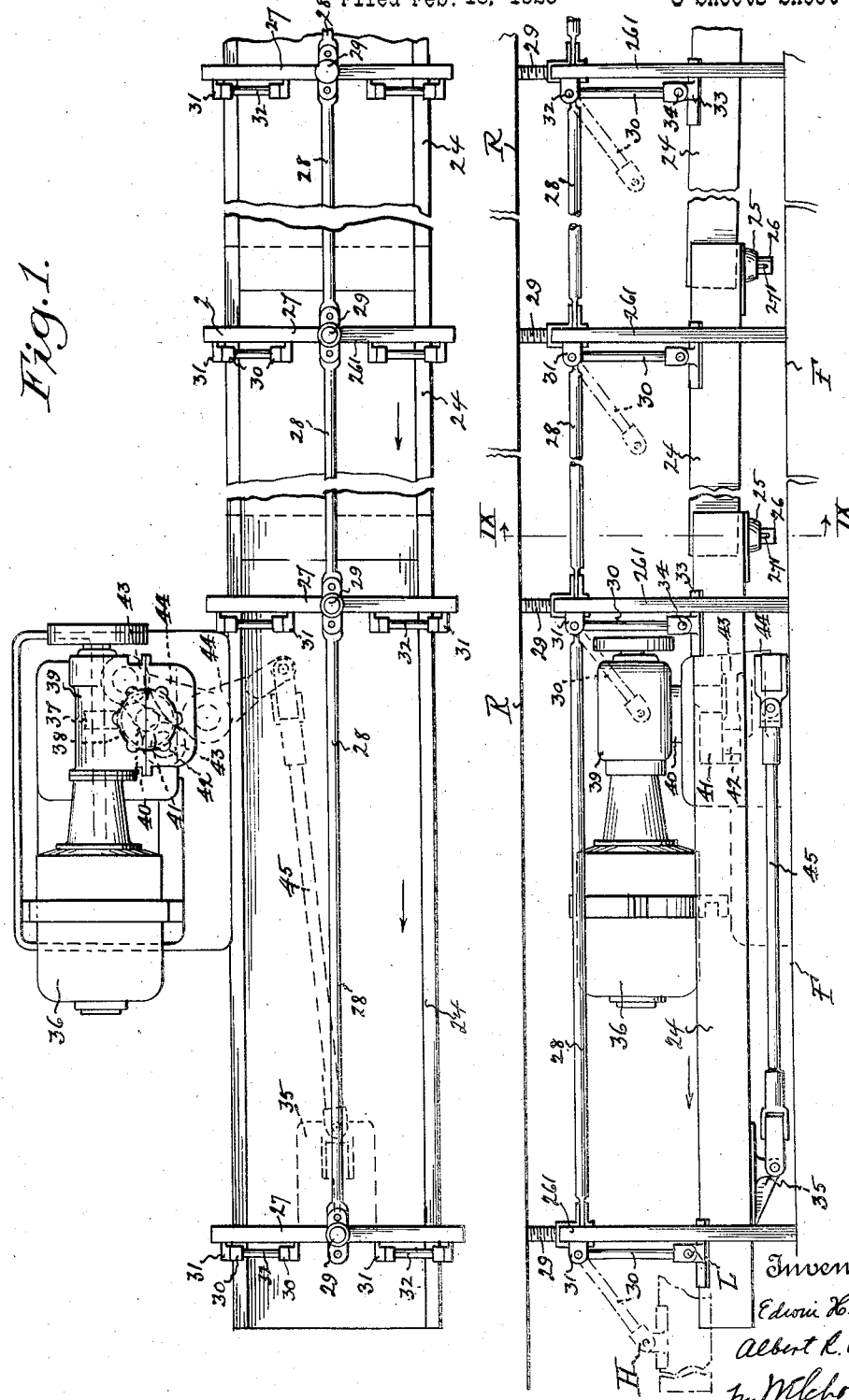
Fig. 1.  Fig. 2.

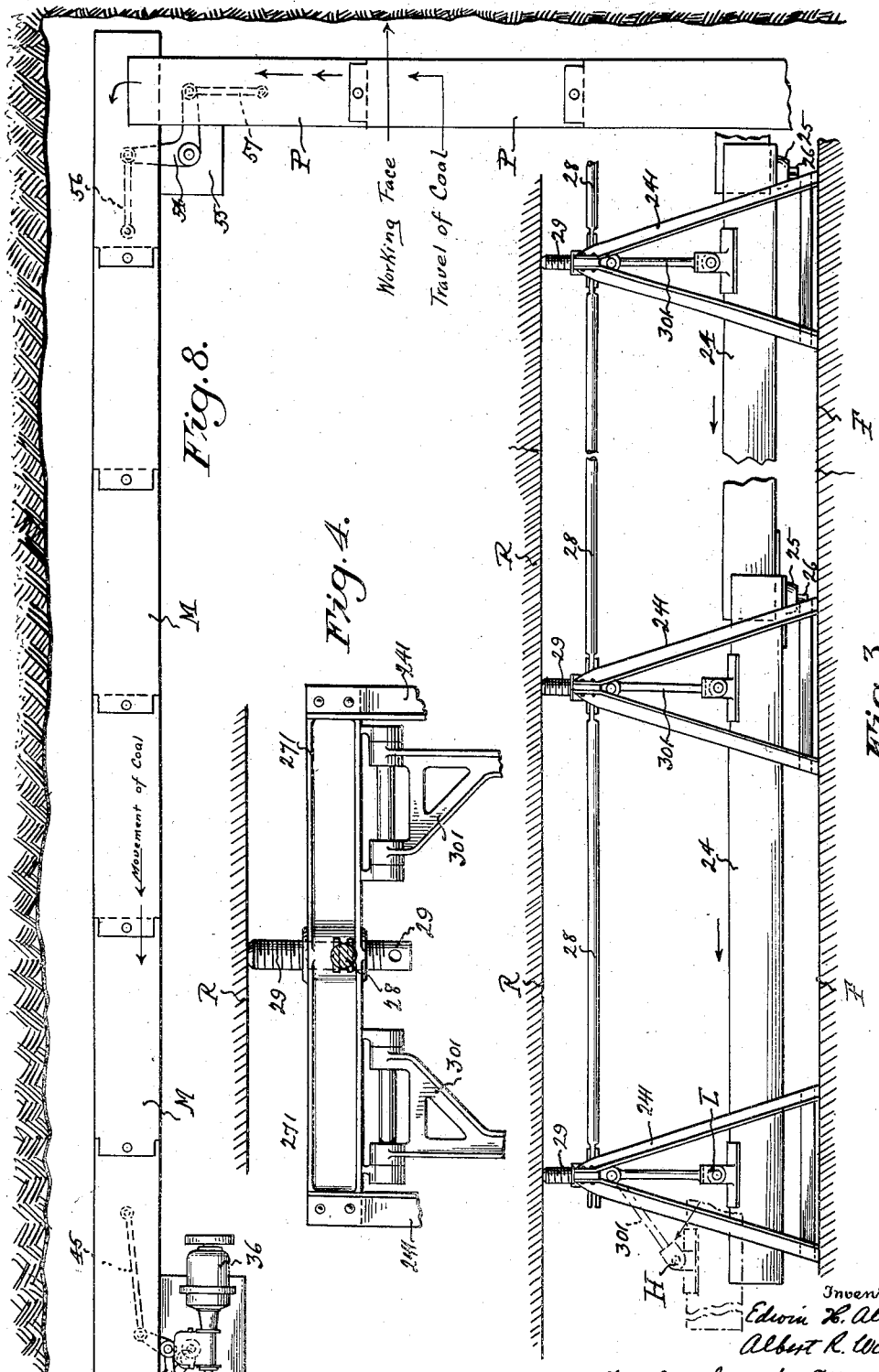

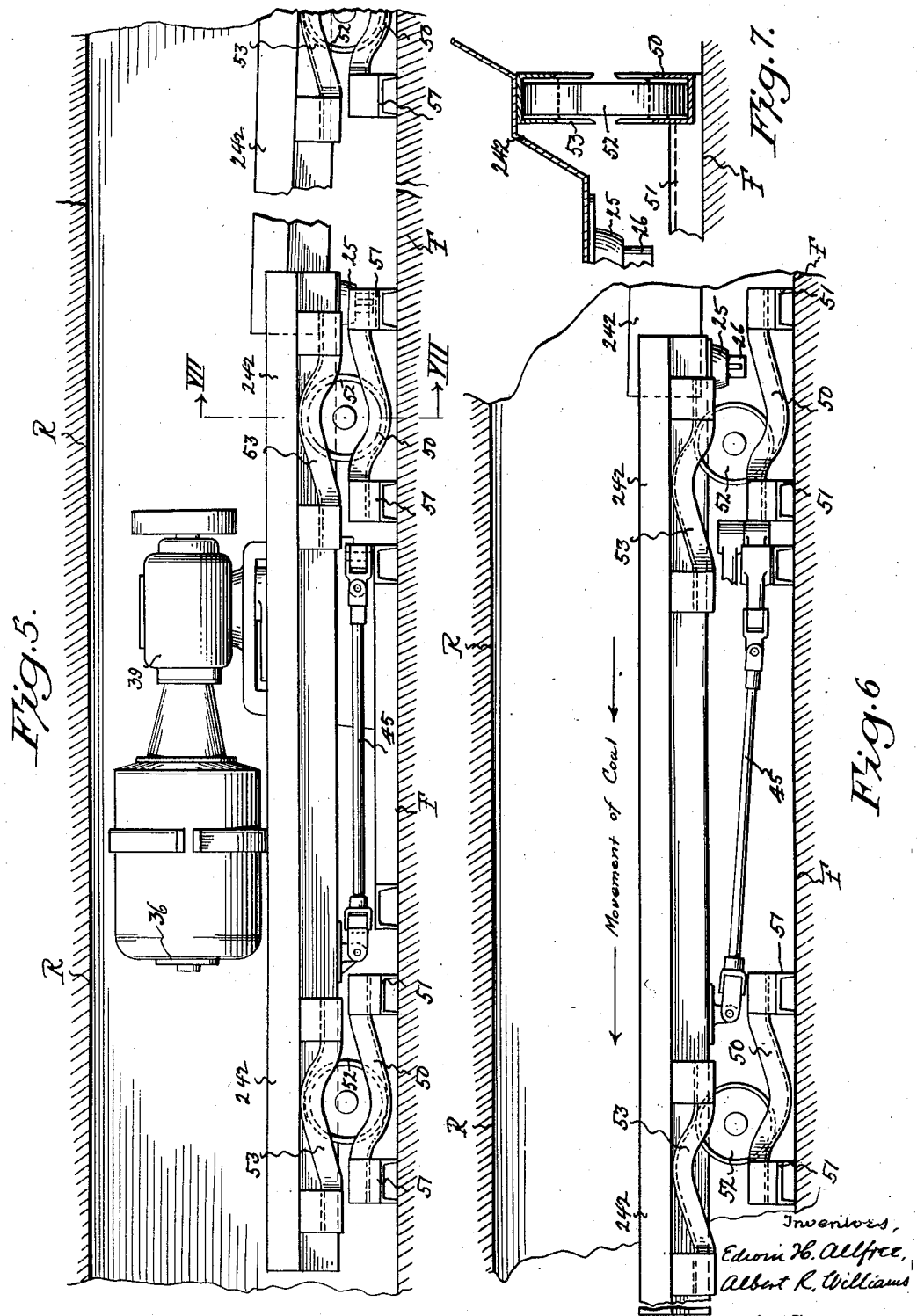

March 20, 1928.  1,662,808
E. H. ALLFREE ET AL
CONVEYER
Filed Feb. 18, 1926　　　8 Sheets-Sheet 4
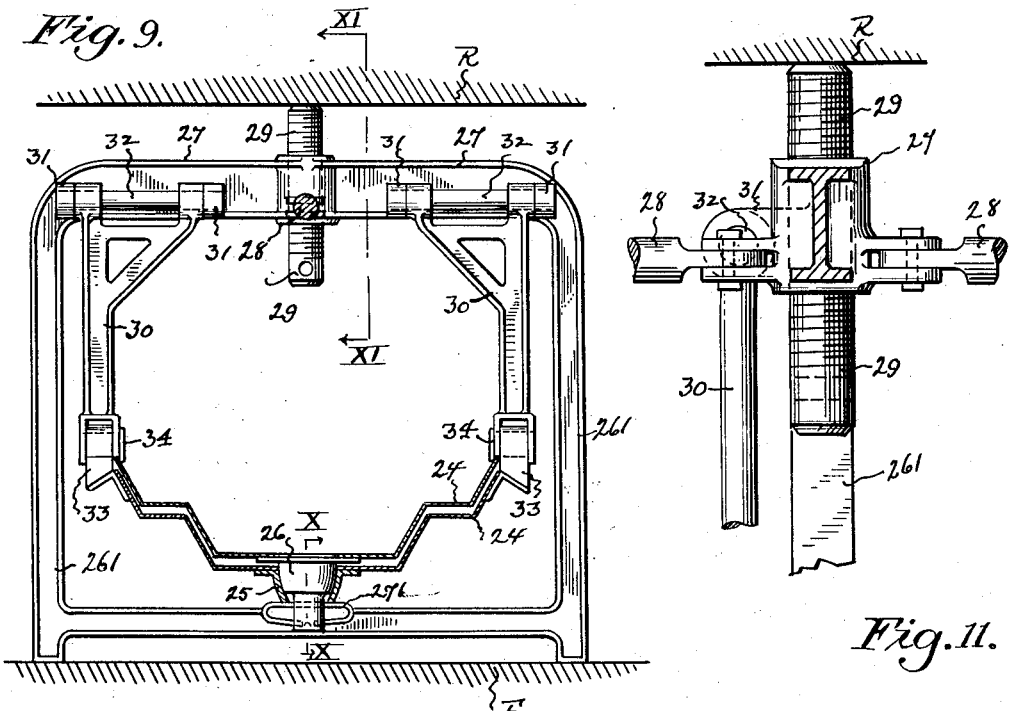
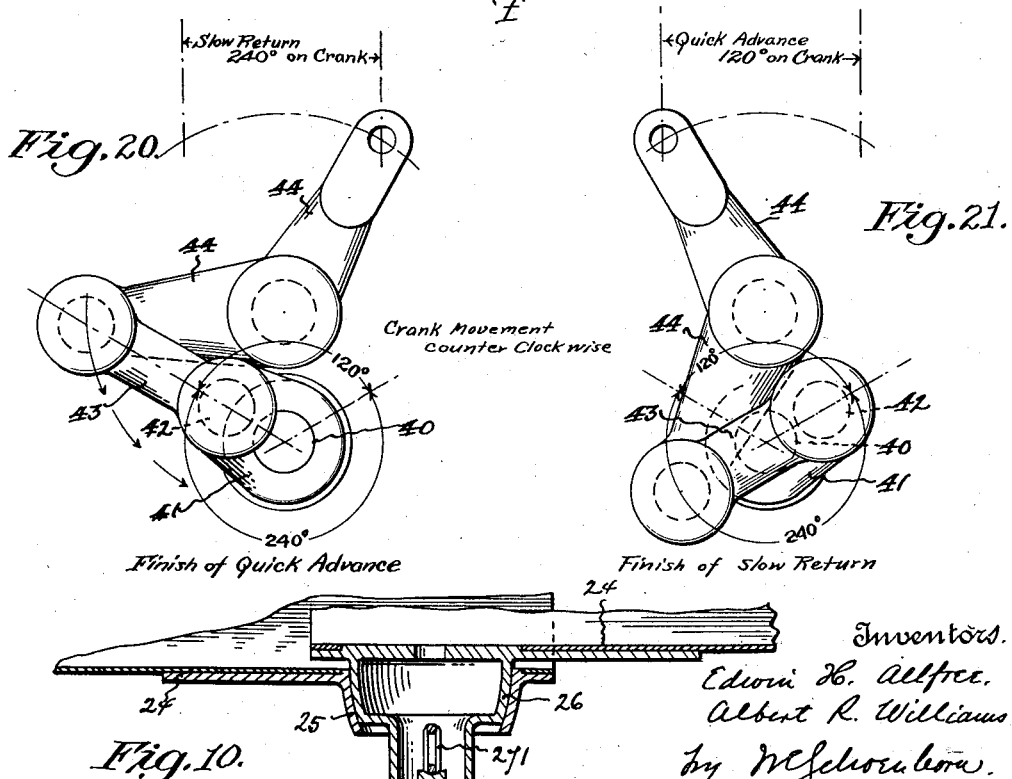

March 20, 1928. 1,662,808
E. H. ALLFREE ET AL
CONVEYER
Filed Feb. 18, 1926 8 Sheets-Sheet 5
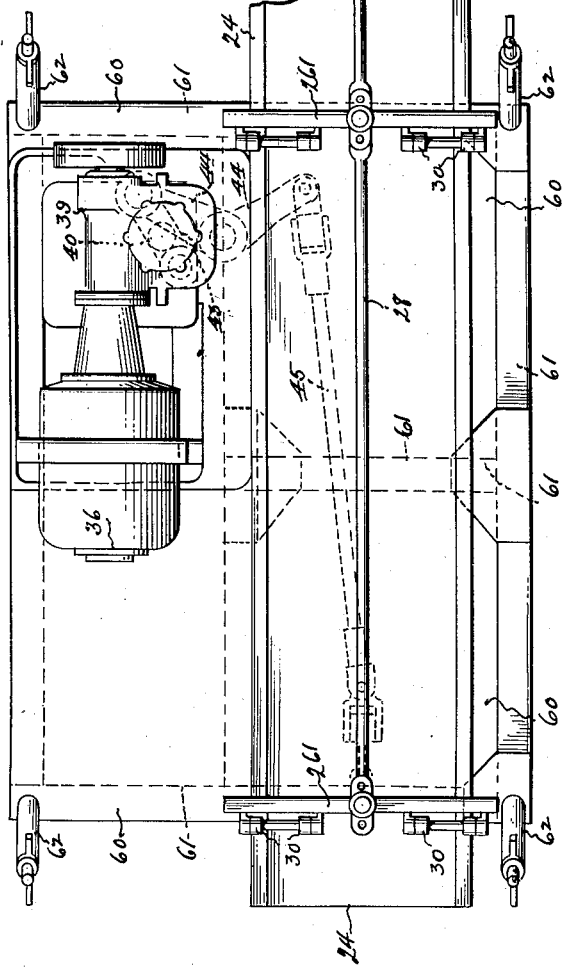
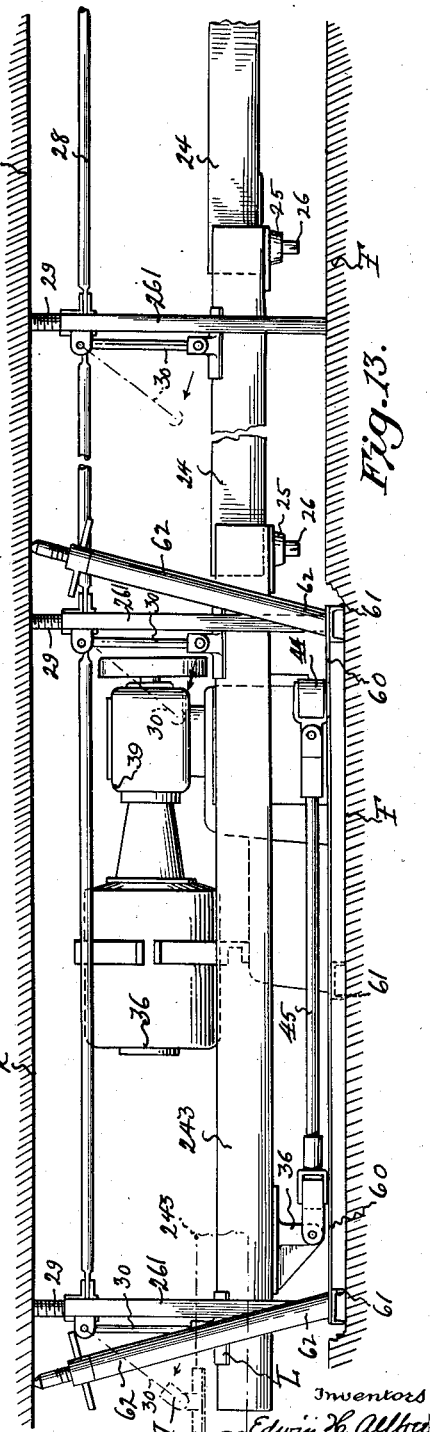

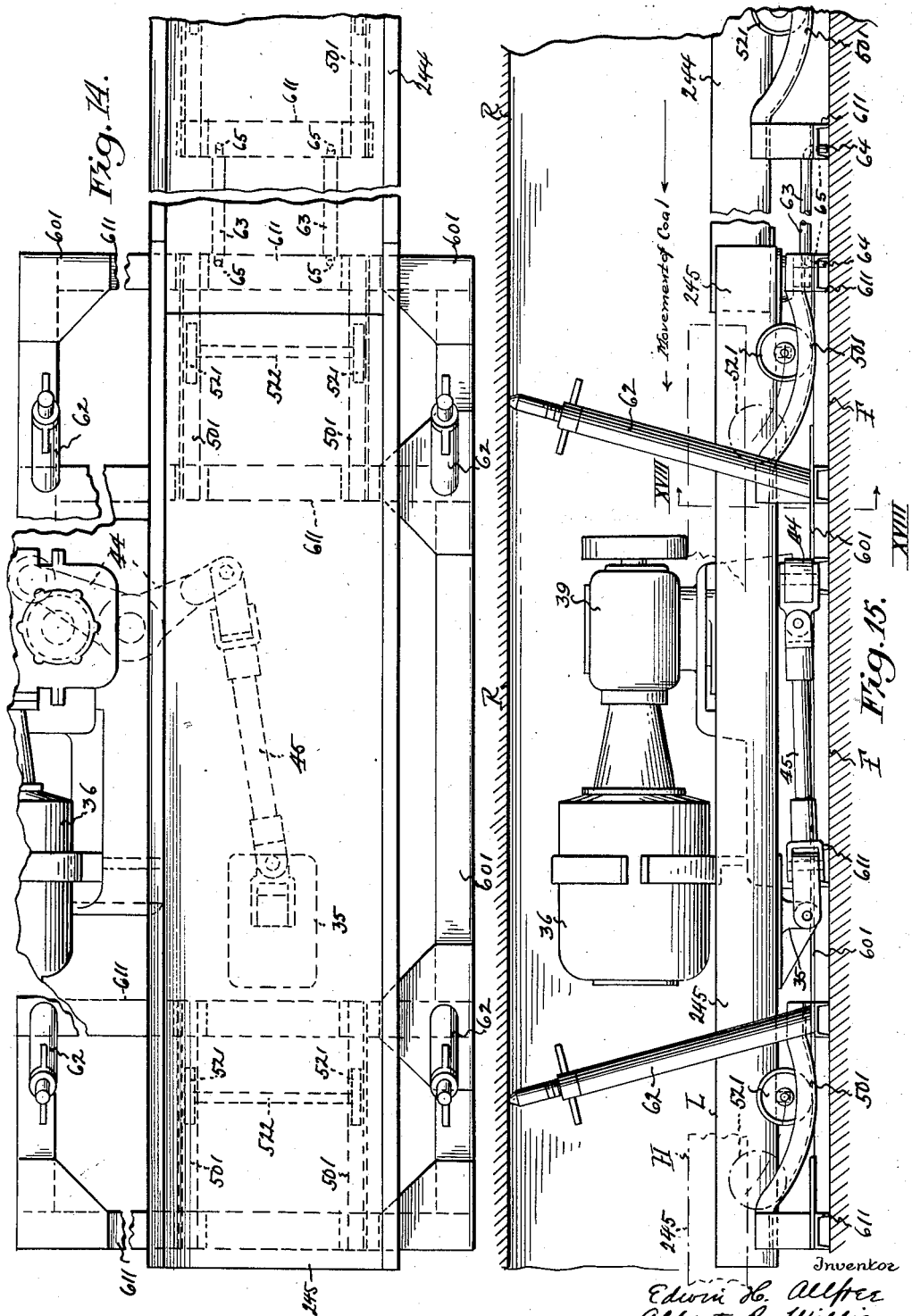

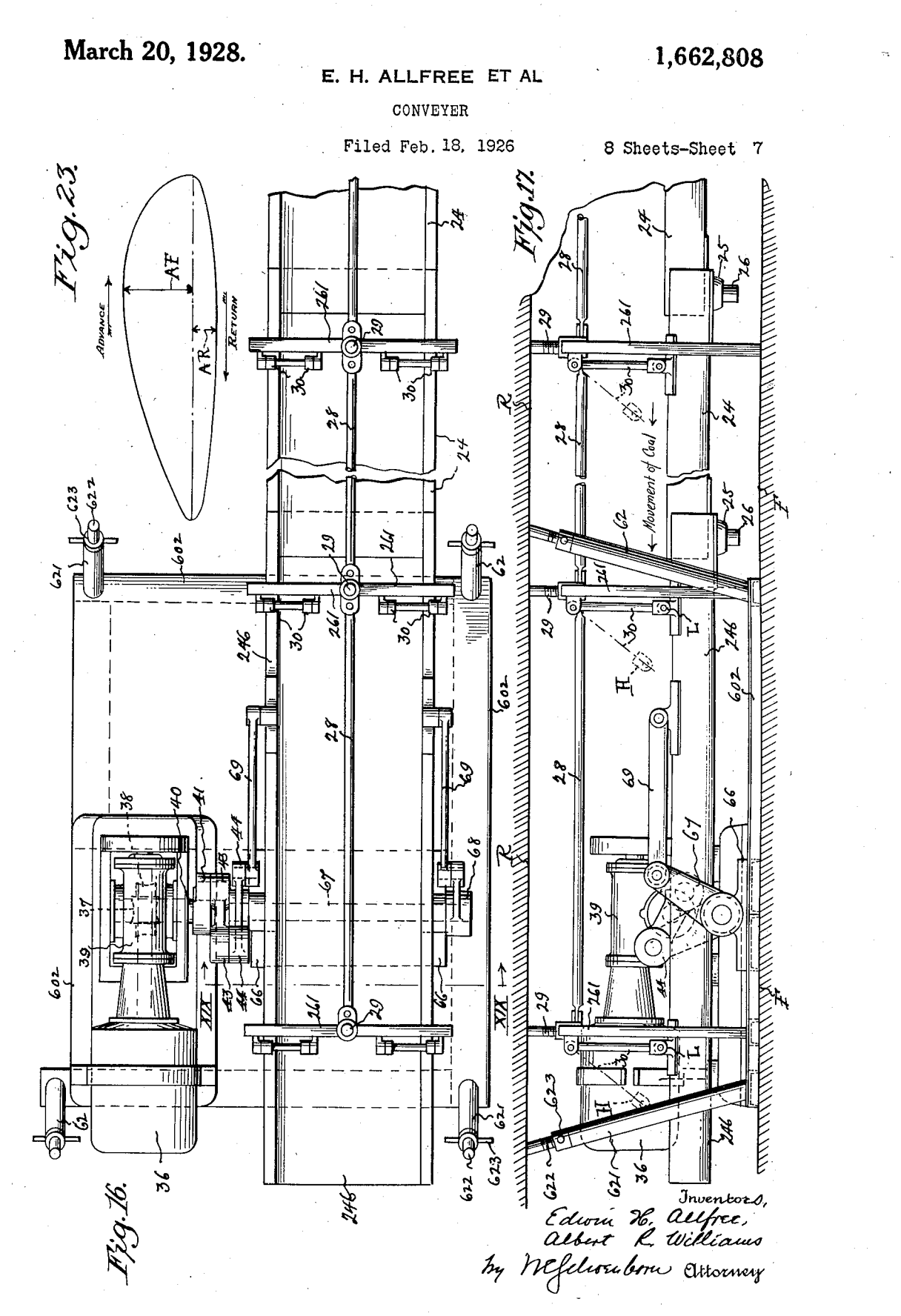

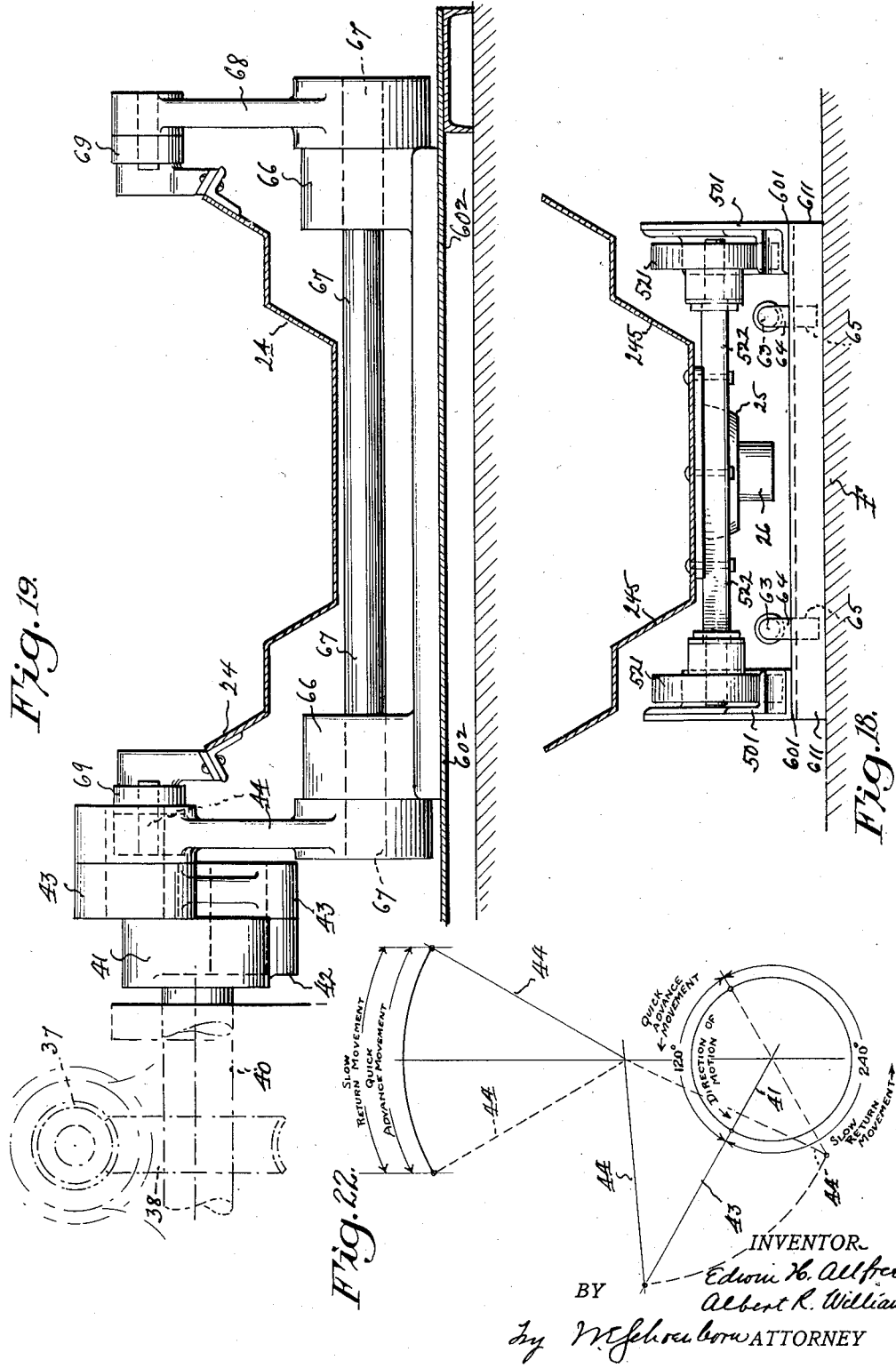

Patented Mar. 20, 1928.

1,662,808

UNITED STATES PATENT OFFICE.

EDWIN H. ALLFREE AND ALBERT R. WILLIAMS, OF IRONTON, OHIO, ASSIGNORS TO THE IRONTON ENGINE COMPANY, OF IRONTON, OHIO, A CORPORATION OF OHIO.

CONVEYER.

Application filed February 18, 1926. Serial No. 89,128.

Our invention relates to improvements in conveyers and more particularly to the reciprocating pan, chute or carrier type designed to convey coal, ores, minerals and other materials, and contemplates the use of a series of pans or chutes suitably connected and supported for their proper reciprocation or oscillation and at the same time give said pans or chutes a certain positive and predetermined rising and falling motion with respect to their lengthwise reciprocations which will be most efficient for the movement of the material in the conveyers.

The objects of the invention are:

First, to construct a conveyer of the type above referred to which can be easily and quickly assembled or disassembled, of such size to form a low type of conveyer which can be readily adjusted, run up to a working face of a mine and firmly secured, and of such a height as to enable the miners to shovel the coal, minerals, or other material into the pans or chutes of the conveyer with the minimum of movement and labor.

Second, to construct a conveyer of the character above explained which has a minimum of weight, is easily portable, less expensive to manufacture and more simple in its construction and readily moved in sections in a short time between the mine posts or props to new positions and satisfactory alinement during the setting up operations in a mine.

Third, to provide a conveyer which is provided with sections detachably and flexibly connected together and said sections can be moved quickly and easily as units into various positions in the mine.

Fourth, to provide a conveyer consisting of pans or chutes having combined reciprocity and rising and falling motions and supported by means reacting against the roof and bottom of the mine.

Fifth, to provide a conveyer of the character indicated comprising a plurality of flexibly connected sections in which a part of said sections may be arranged at any angle and out of line from the main section and disposed parallel to the working face of the mine and all the sections of the conveyer acting simultaneously as a single unit in transporting the same material and operated by a single motor.

Sixth, to provide a driving mechanism for the continuous and proper operation of the conveyer which can be easily and quickly moved in the mine separately or as a unit and connected or disconnected from the reciprocating pans or chutes comprising the material carrying elements of the conveyer.

Seventh, to construct and arrange the elements of the driving mechanism so as to reduce the motion between the motor and the balance of the driving gear for the purpose of minimizing the noise during the operation of the conveyer and permitting the hearing of warning cracks should the mine roof begin to fall.

Eighth, to so devise the connection between the motor and the chutes or pans comprising the sections of the conveyer that such sections will have a combined vertical and longitudinal reciprocation having rapid forward strokes in one direction and alternating with slow return strokes in the opposite direction, the rapid forward strokes having slowly increasing velocity from the beginning and reaching its maximum velocity after the said rapid forward stroke is half completed and then rapidly decreasing the velocity during the balance of said stroke, the decrease of velocity being rapid compared to the slower increase. The slow return stroke in the opposite direction having increasing velocity from the beginning of said stroke and reaching its maximum velocity before the stroke is half completed, then decreasing its velocity during the balance of its stroke, the decrease of velocity being slow as compared to the more rapid increase.

Ninth, other objects and advantages of the invention will appear from the detailed description of construction and manner of assembling and operation of the conveyer to be presently described.

The invention consists of structural characteristics and relative arrangement of elements to be hereinafter disclosed.

In the eight sheets of drawings similar reference characters indicate the same parts in the several figures in which, Figure 1 is a plan view of a portion of the conveyer and means for operating the same.

Figure 2 is a side elevation of the form shown in Figure 1 with the supporting frames engaging the mine floor and roof.

Figure 3 is a side elevation of the conveyer with a modified form of supporting frames.

Figure 4 is an enlarged and fragmentary end view of the top portion of the modified form of supporting frames shown in Figure 3.

Figure 5 is a side elevation of a modified form of the conveyer and means for operating the same.

Figure 6 is a side elevation of the conveyer shown in Figure 5 in the forward or delivering position.

Figure 7 is an enlarged and fragmentary section on line VII—VII of Figure 5.

Figure 8 is a plan view of a conveyer and means for driving the same similar and on a reduced scale to that illustrated in Figure 1, showing the loading section parallel to the working face of the mine and connected to the main conveyer section in such a manner that both sections operate in unison.

Figure 9 is an enlarged sectional view taken on line IX—IX of Figure 2.

Figure 10 is an enlarged and fragmentary sectional view taken on line X—X of Figure 9.

Figure 11 is an enlarged and fragmentary sectional view taken on line XI—XI of Figure 9.

Figure 12 is a plan view of a modified form of the conveyer shown in Figures 1 and 2.

Figure 13 is a side elevation of the conveyer shown in Figure 12.

Figure 14 is a plan view of a further modified form of the invention.

Figure 15 is a side elevation of the conveyer illustrated in Figure 14.

Figure 16 is a plan view of an additional modified form of the conveyer.

Figure 17 is a side elevation of the conveyer shown in Figure 16.

Figure 18 is an enlarged sectional view taken on line XVIII—XVIII of Figure 15.

Figure 19 is an enlarged sectional view of the conveyer pan taken on line XIX—XIX of Figure 16.

Figures 20 and 21 show the driving crank and levers in the two extreme positions of their stroke.

Figure 22 shows a diagram of the lever movement of the driving mechanism, and

Figure 23 is a velocity diagram of the movement of the conveyer.

Referring to Figures 1, 2, 9, 10 and 11, 24, 24 are a series of flexibly connected and reciprocating sections comprising the conveyer which sections are preferably of trough-shape in transverse section and each section is provided at one end with a spherical-shaped depression or socket 25, while its other end has extending from its underside a rigid and ball-shaped projection or pin 26 adapted to be revolvably seated, as shown in Figures 9 and 10, in the spherical-shaped depression 25 of the overlapping end of the adjacent conveyer section 24 below the projection 26, said projection or pin 26 is held seated in its socket 25 by means of a spring key 271, as shown, whereby the overlapping ends of the conveyer sections 24, 24 are detachably and flexibly connected together and capable of ready disconnection, if so desired.

261, 261, are frames which are properly spaced and longitudinally connected together at their upper sides 27, 27 by struts or tie bars 28, 28, at each of the upper sides 27, 27, and at the middle section of the frames 26 is provided a jack screw 29 which is capable of being so adjusted to have the upper end of the screw to engage and abut against the roof of the mine and thereby rigidly clamp and hold each of the frames 26, 26, in an upright position between the roof R and floor F of the mine, as indicated in Figures 2 and 9.

30, 30 are hangers having their upper ends pivotally connected by means of brackets 31, 31 and shafts 32, 32 to the upper sides 27, 27, of the frames 26, 26, while the lower ends of the hangers 30, 30 are connected to the conveyer sections 24, 24 by means of brackets 33, 33 and pins 34, 34, as shown in Figure 9.

Secured to the underside of one of the sections 24 of the conveyer is a driving bracket or connection 35, see Figures 1 and 2, for purposes to be presently disclosed.

36 is a motor which rotates a shaft having a worm 37, and said worm actuates a gear 38 in the gear case 39. The rotation of the gear 38 actuates a shaft 40, having keyed thereto a crank 41 having its end 42 connected by a link 43 to a bell crank 44, as shown in Figures 1, 2, 16, 19, 20 and 21, and said bell crank 44 is connected to the driving bracket or connection 35 by means of a link 45, whereby the variable lineal motion of the end of the bell crank 44, to be hereinafter more fully described, is imparted to the conveyer sections 24, 24, and the use of the worm gear 37 in combination with gear 38 to rotate the shaft 40 reduces to a minimum the noise in transmitting the power of the motor to the conveyer sections 24, 24, and enables the miners to easily detect any threatening noise due to the cracking or giving away of the ceiling or side walls of the mine shaft when mining operations are being carried out, said motor 36 being preferably operated by electricity.

Figures 3 and 4 show substantially the same type of conveyer sections as described with reference to Figures 1 and 2, except that the frames 241 for carrying the hangers 301 are triangular in longitudinal cross section to add to their stability and the connections and bearings for upper ends of said hangers 301 are directly below its upper side 271 are spaced apart to permit considerable wear and at the same time prevent any side-wise movement to conveyer.

In Figures 5, 6 and 7 are shown a conveyer of the same general type as described in which the supporting frames and hangers hereinbefore described are dispensed with and the reciprocating and flexibly connected conveyer sections 242 are supported by and travel on track sections 50, 50, curved in a vertical plane, said track sections 50, 50, being detached and under and at each side of the portion of the ends of each conveyer section 242 and connected by inverted channel irons 51, 51, which rest on the mine floor F. The track sections 50, 50, are U-shaped in cross section, as clearly shown in Figure 7, and in which are loosely disposed and move roller wheels 52, 52, as indicated.

Directly above said track sections 50, 50, and attached to the bottom and near the edges of the conveyer sections 242 are complementary, coacting and reversely curved track sections 53, 53, so constructed and disposed to rest on the upper and exposed curved surfaces of the roller wheels 52, 52, in such a manner as to support said conveyer sections 242, 242, and permit the same to be easily reciprocated by the motor 36 connected thereto by link 45, as previously described.

As will be seen, the track sections 50, 50, have an inclined surface portion of their length and a curvature of abrupt radius at the remainder of their length which inclination and radius may be altered to suit the requirements of the character and quantity of the material to be conveyed without in any way affecting the essential characteristics of the invention, and the roller wheels 52, 52, cooperating with the track sections 50, 50, and 53, 53, can be made to give the conveyer sections 242 approximately the same rise and pitching effect as is produced when the conveyer sections are hung from frames 261, 261, by hangers 30, 30, as described with reference to Figures 1, 2 and 3.

Figure 8 shows a plan view of an arrangement for connecting up the conveyer sections when it is desired to adapt said sections to two working faces of a mine which are at an angle to each other, and is accomplished by having a bell crank 54, pivotally mounted on a fixed base or frame 55, one arm of said bell crank 54 being pivotally connected by link 56 to the underside and end of a drive or main conveyer section M reciprocated by a motor 36, as previously explained, and the other end of the bell crank 54 connected by a link 57 to the section P of the conveyer arranged at an angle to said section M, so that both sections M and P are operated by a single motor 36 in unison and the material fed in section P is conveyed and discharged into and passes along section M, as will be readily understood.

Figures 12 and 13 show the same general construction of conveyer, as shown and described with reference to Figures 1, 2 and 3, except in that the means for actuating the conveyer, the driving section of the conveyer and its supporting frames are assembled and move on a common base as a unit, so that actuating means and said driving section of the conveyer will be maintained in correct position and alinement with each other, and consists of a base plate 60, attached to and resting on inverted channels irons 61, 61, on which at its ends are provided in an upright position the frames 261, 261, having the hangers 30, 30, for suitably supporting, as hereinbefore explained, the driving section 243 of the conveyer. Also, anchored to and carried by said base plate 60 is the motor 36 which through its crank 41, link 43, bell crank 44, and link 45 connected to the driving bracket 35 on the underside of the driving section 243 reciprocate said driving section 243 with its flexibly connected conveyer sections 24, as previously described.

Frames 261, 261, are mounted and secured to the base plate 60 in an upright position and held in place by the jack screws 29, 29 of the frames 261, 261, acting against the roof R of the mine, and in order to securely and immovably hold the unitary structure comprising the base plate 60, with the frames 261, 261, and reciprocable driving section 243, motor 36 in adjusted alinement, mine jacks 62, 62 are disposed at an angle at each corner of said base plate 60, as shown in Figure 13, to insure the non-creeping or lifting of said base plate 60 with respect to the mine floor F during the operation of the motor 36.

Figures 14, 15 and 18 show substantially the same modification of the invention as shown and described with reference to that just explained with reference to Figures 12 and 13, except that the same is shown in connection with the arrangement of supporting the conveyer sections 244 on tracks 501 similar to that shown in Figures 5, 6 and 7, except instead of an inverted track section 53, as shown in Figures 5 and 6, being secured to each end and side of conveyer sections 242, said conveyer sections 244 are provided with roller wheels 521, 521, carried by axles 522 attached to the bottom of said conveyer sections and said wheels 521, 521 are so disposed and arranged to roll back and forth on said track sections 501, see Figure 18, as will be readily understood. The driving conveyer section 245 of the form shown in Figures 14 and 15 is also similarly supported on tracks 501, 501, which are rigidly secured on a base plate 601 carried by channel irons 611, similar to that shown and described with reference to Figures 12 and 13, said base plate 601 likewise being held immovable with respect to the mine floor F by means of the mine jacks 62, as heretofore explained, and the tracks 501, 501 of the adjacent ends of the driving conveyer section 245 and sections 244 are properly spaced and held in correct and adjusted alinement by means of spacing rods 63 having bent ends 64 inserted in holes 65 provided in the transversely arranged and inverted channel irons 611, 611, as shown in Figures 15 and 18.

The motor 36 is also anchored to and carried by the base plate 601 and the bell crank 44 and link 45 are connected to the driving bracket 35 of the driving section 245, and said motor 36 and driving conveyer section 245 with its supporting tracks 501, 501 and the connecting driving mechanism are organized and carried by said base plate 601 as a unitary structure and held in position on the mine floor F by means of and in similar manner by mine jacks 62, 62, as described with reference to Figures 12 and 13 and need no additional explanation.

In Figures 16, 17 and 19 are shown a modification of the conveyer in which the conveyer sections 24, 24 are linked together and supported by hangers 30, 30 from frames 261, provided with tie bars or rods 28 and jack screws 29 in the same manner as described with reference to Figures 1, 2 and 9, but in said modification the driving unit comprising the motor 36, crank shaft 40, crank 41, link 43, bell crank 44, is rigidly secured and mounted on a base plate 602, similar to that disclosed in connection with the forms shown in Figures 12, 13, 14 and 15. In this present form there are also mounted on the base plate 602, two separated shaft bearings 66, 66, situated below and free from contact with the superimposed driver conveyer section 246, as shown in Figures 16 and 19.

Rotatably supported in said bearings 66, 66, is a rocker shaft 67, and on one end of said shaft 67 is mounted the bell crank 44 and on its other end is keyed a rocker arm 68. The free end of each of the bell crank 44 and rocker arm 68 is connected to an end of a link 69, 69, while the other end of each of the links 69, 69 is pivotably secured to opposite sides of the driving conveyer section 246, as shown, for the purpose of reciprocating said section 246 on its hangers 30, 30 during the operation of the motor 36, as will be readily understood.

It will also be seen and understood that while the driving section 246, as shown, might be disposed and attached at the delivery end of the conveyer, this section 246, however, can be installed at any part of the conveyer without in any way changing the operation or functions of the driving conveyer section 246 or any other conveyer section with its attached supporting means or the motor 36 and its cooperating mechanism for actuating said section 246.

As described in connection with the forms shown in Figures 12, 13, 14 and 15, the hanger frames 261, jack screws 29 and mine jacks 62 are secured to the base plate 602 and adjustable with respect to the mine roof R and floor F, as previously explained, to firmly hold the base plate 602 with its driving unit in an adjusted and fixed location within the mine, and in order to assume the proper adjustment and clamping of said mine jacks 62 with respect to the roof and floor of the mine and base plate 602, said jacks 62 are preferably constructed of a hollow strut section 621, a screw 622 passing into said strut and a winged nut 623 engaging said screw 622 and abutting against the adjacent end of said strut to vary the length of said screw exposed above said nut.

The manner of operating or reciprocating the conveyer sections on their hangers or supports to obtain a variable motion of a quick advance movement and a slow return movement by the angular relations of the crank shaft 40, crank 41, link 43, bell crank 44 with respect to link 45 connected with the said conveyer sections, as heretofore described, is clearly shown in Figures 20, 21 and 22, in which Figure 20 shows the relative position of bell crank 44, connecting link 43 and crank 41 at the finish of the quick advance or beginning of the slow return movement of the operating or connecting end of the bell crank which controls the movement of the conveyer sections, and as will be seen from the diagram shown in Figure 22 said slow return movement is through an angle of 240 degrees of the crank revolution.

Figure 21 shows the relative position of the bell crank 44, connecting link 43 and crank 41 at the end of the slow return movement or beginning of the quick advance movement, and as will be seen from diagram shown in Figure 22 said quick advance movement is through an angle of 120 degrees of the crank revolution, and while I have shown and described a ratio of 2 to 1 with respect to said quick advance and slow return movements, said ratio may be varied, if so desired, by the proper proportioning and angular relation of the crank 41, link 43 and bell crank 44 with each other, as will be readily understood and needs no further disclosure.

Figure 23 represents a velocity diagram during the forward, advance or left to right movement and return or right to left movement, in which the ordinates represent the relative velocities for the complete stroke, and as will be seen from said diagram the conveyer sections will not only have a vertical movement due to the arrangement of hangers and supporting tracks for the sections but at the same time due to the variable operating phases of velocity of the longitudinal reciprocation the conveyer sections will have rapid forward or advance strokes in one direction and alternating with slow return strokes in the opposite direction, the rapid forward strokes having slowly increasing velocity from the beginning and reaching its maximum velocity after the said rapid forward stroke has reached the ordinates FA, or slightly more than half completed, and then rapidly decreasing this velocity during the balance of said forward stroke, said decrease being rapid compared to the slower increase. The slow return stroke in the opposite direction having increasing velocity from the beginning of said stroke and reaching its maximum velocity at the ordinates RA, or before the stroke is half completed, then decreasing its velocity during the balance of its stroke, the decrease of velocity being slow as compared to the more rapid increase at the beginning of the return stroke.

The operation of the conveyer is as follows:

The motor 36 having been started, the flexibly connected and suitably supported conveyer sections are reciprocated by said motor 36 through the crank shaft 40, crank 41, link 43, bell crank 44 and link 45 connected to the driver conveyer section, and said conveyer sections are accordingly moved in the first part of the stroke from right to left and elevated from L to H, as indicated in Figures 2, 3, 13, 15 and 17.

This rising movement from right to left, as previously explained, will be rapid during this phase of the conveyer's reciprocation as the free end of the bell crank 44 moves in the arc of a circle from the position indicated in Figure 21 to that shown in Figure 20, while the crank 41 is making one-third of a revolution or 120 degrees of its travel. The slow return stroke of the conveyer sections will be from H to L while the end of bell crank 44 moves through the arc from the position shown in Figure 20 to that shown in Figure 21, and the crank 41 moves through the remaining two-thirds revolution or 240 degrees of its travel. This rapid motion of the conveyer sections during their forward and rising operation gives a tossing and pitching action similar to that produced by a person using a shovel, and hence any material having been deposited and resting on the bottom of the conveyer sections will be progressed from the right to left, as indicated by arrows, and move along and through the entire length of the series of flexibly connected conveyer sections from the point where deposited in the sections to the receiving or outlet end of the conveyer, as will be readily understood. The movement of the material within the conveyer sections is in the direction with which said conveyer sections are elevated and away from the receiving or loading point of the conveyer sections, and it has been found that the rise and fall or vertical movement of the conveyer sections combined with a positive and unyielding longitudinal reciprocation of variable velocity as effected by the present invention produces a simple and highly efficient conveyer, unfailing in its action and able to deliver material not only on the level but on ascending or descending grades, and owing to the construction of the flexible or universal joints between the several conveyer sections it is not necessary that the conveyer sections be set up in alinement with each other and no lost motion is capable of being developed between the ends of the flexibly and easily detachable linked together conveyer sections.

From the foregoing description of the construction and arrangement of parts, mode of assembling the same and their operation, it will be seen that all the objects and advantages recited in the statement of invention have been fully, efficiently and cheaply carried out, and while the preferred form has been shown and described, it is to be understood that many changes will suggest themselves without in any way varying the essential features of construction or departing from the spirit of the invention as expressed in the claims.

What we claim is:

1. A conveyer of the character described comprising a plurality of connected and reciprocating conveyer sections, means for raising and lowering conveyer sections during their reciprocation, means for imparting reciprocating motion to said conveyer sections consisting of a motor operating a reduction gear, a crank operated by said reduction gear, a bell crank, a link connecting said crank with one end of the bell crank, and a link connecting the other end of the bell crank with the reciprocating conveyer sections for imparting a reciprocatory motion to said conveyer section with a quick movement of said sections during their raising and a slow movement during the lowering of said conveyer sections.

2. A conveyer of the character described comprising flexibly connected and reciprocating driving conveyer and auxiliary conveyer sections, means for raising and lowering said conveyer sections during their reciprocation, a base plate, means rigidly supported and carried by said base plate as a unitary structure for imparting a reciprocatory motion to said driving conveyer section, said means so constructed, arranged and adapted to effect a quick movement of the conveyer sections during their raising and a slow movement during the lowering of said conveyer sections, and means for rigidly securing said base plate.

3. A conveyer of the character described comprising a plurality of flexibly connected and reciprocating driving conveyer and auxiliary conveyer sections, means for raising and lowering said conveyer sections during their reciprocation, a base plate, means for imparting a reciprocatory motion to said driving conveyer section, said means for raising and lowering and reciprocating said driving conveyer section rigidly supported and carried by said base plate as a unitary structure and so constructed, arranged and adapted to effect a quick movement of the conveyer sections during their raising and a slow movement during the lowering of said conveyer sections.

4. A conveyer of the character described comprising a plurality of connected and reciprocating conveyer sections, means for raising and lowering conveyer sections during their reciprocation, means for imparting reciprocatory motion to said conveyer sections consisting of a motor operating a shaft having a worm, worm gear in mesh with said worm, a crank operated by said worm gear, a bell crank, a link connecting said crank with one end of the bell crank, and a rod pivotally connecting the other end of the bell crank with the reciprocating conveyer sections for imparting a reciprocatory motion to said conveyer sections with a quick movement of said sections during their raising or forward motion and a slow movement during the lowering or return stroke of said conveyer sections.

5. A conveyer of the character described comprising a plurality of connected and reciprocating conveyer sections, means consisting of curved tracks detached and below said conveyer sections and superimposed tracks attached to said conveyer sections and rollers interposed between said superimposed tracks for raising and lowering said conveyer sections during their reciprocation, means for imparting a reciprocatory motion to said conveyer sections so constructed, arranged and adapted to effect a quick movement of the conveyer sections during their raising and a slow movement during the lowering of said conveyer sections.

6. A conveyer of the character described comprising a plurality of flexibly and detachably connected reciprocatory conveyer sections, each of said conveyer sections having a spherical recess or socket at one of its ends and a spherical pin or extension projecting from the underside of its other end, the pin of one conveyer section rotatably seated in the recess of the adjacent conveyer section.

7. A conveyer of the character described comprising a plurality of flexibly and detachably connected reciprocatory conveyer sections, each of said conveyer sections having a spherical recess or socket at one of its ends and a spherical pin or extension projecting from the underside of its other end, the pin of one conveyer section rotatably seated in the recess of the adjacent conveyer section, and each of said pins having means for retaining the same in its seat or socket.

8. A conveyer of the character described comprising a plurality of connected and reciprocating conveyer sections, means for raising and lowering said conveyer sections during their reciprocation, means for imparting a reciprocatory motion to said conveyer sections so constructed, arranged and adapted to effect a combined vertical and longitudinal movement having a quick stroke in one direction alternating with a slow stroke in the opposite direction, the quick strokes having a slow increasing velocity from the beginning of their strokes reaching a maximum velocity after said stroke is half completed, then rapidly decreasing its velocity during the remainder of the stroke, said decrease being greater than the initial slower increase of velocity, and the slow strokes in the opposite direction having increasing velocity from the beginning of their strokes reaching a maximum velocity before the stroke is half completed, then decreasing the velocity during the remainder of said stroke, said decrease being slower than the initial increasing velocity of said return stroke.

In testimony whereof, we affix our signatures.

EDWIN H. ALLFREE.
ALBERT R. WILLIAMS.